(12) United States Patent
Nishimura (10) Patent No.: US 10,730,703 B2
(45) Date of Patent: Aug. 4, 2020

(54) CONVEYING APPARATUS, CONVEYING METHOD AND INSPECTION SYSTEM

(71) Applicant: SCREEN HOLDINGS CO., LTD., Kyoto (JP)

(72) Inventor: Tomomitsu Nishimura, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 16/619,897

(22) PCT Filed: Apr. 19, 2018

(86) PCT No.: PCT/JP2018/016095
§ 371 (c)(1),
(2) Date: Dec. 5, 2019

(87) PCT Pub. No.: WO2018/225395
PCT Pub. Date: Dec. 13, 2018

(65) Prior Publication Data
US 2020/0165073 A1    May 28, 2020

(30) Foreign Application Priority Data
Jun. 7, 2017 (JP) .................................. 2017-112410

(51) Int. Cl.
*B65G 47/248* (2006.01)
*B65G 47/90* (2006.01)
*G01N 35/04* (2006.01)

(52) U.S. Cl.
CPC ......... *B65G 47/248* (2013.01); *B65G 47/902* (2013.01); *G01N 35/04* (2013.01); *B65G 2203/04* (2013.01); *G01N 2035/046* (2013.01)

(58) Field of Classification Search
CPC .... B65G 47/248; B65G 47/252; B65G 25/00; B65G 25/08; B65G 25/10; B65G 25/12; B65G 2203/04
(Continued)

(56) References Cited

U.S. PATENT DOCUMENTS 8,056,701 B2 * 11/2011 Sugimoto .............. B65G 35/06
198/463.3
8,430,229 B2 * 4/2013 Abbestam .............. B23Q 7/005
198/463.3
(Continued)

FOREIGN PATENT DOCUMENTS

JP    2002-001230 A    1/2002
JP    2009-208963 A    9/2009
(Continued)

OTHER PUBLICATIONS

Taiwanese Office Action issued in corresponding Taiwanese Patent Application No. 107115059, dated Jan. 30, 2019.
(Continued)

*Primary Examiner* — Mark A Deuble
(74) *Attorney, Agent, or Firm* — McDermott Will & Emery LLP (57) ABSTRACT

A movement of the upstream workpiece to the first transfer position by the first mover and a movement of the downstream workpiece to the second transfer position by the second mover are performed in synchronization. A feed of the upstream workpiece from the first transfer position to the second transfer position by the first feeder and a feed of the downstream workpiece from the second transfer position to the third transfer position by the second feeder are performed in synchronization. A movement of the upstream workpiece from the second transfer position to the inversion position by the second mover and a movement of the downstream workpiece from the third transfer position to the
(Continued)

second imaging position by the third mover are performed in synchronization.

9 Claims, 8 Drawing Sheets

(58) Field of Classification Search
USPC ............ 198/378, 402, 406, 407, 409, 463.3
See application file for complete search history.

(56) References Cited

U.S. PATENT DOCUMENTS

| | | | |
|---|---|---|---|
| 8,613,134 B2* | 12/2013 | Doyle | H05K 13/0061 29/832 |
| 2013/0295721 A1* | 11/2013 | Lyu | H01L 24/81 438/108 |

FOREIGN PATENT DOCUMENTS

| | | |
|---|---|---|
| JP | 2016-191620 A | 11/2016 |
| JP | 2017-015421 A | 1/2017 |
| JP | 2017-015422 A | 1/2017 |
| JP | 2017-190962 A | 10/2017 |
| TW | 201712323 A | 4/2017 |
| WO | 2016/122897 A1 | 8/2016 |

OTHER PUBLICATIONS

International Search Report issued in corresponding International Patent Application No. PCT/JP2018/016095, dated May 29, 2018, with English translation.

* cited by examiner

CONVEYING APPARATUS, CONVEYING METHOD AND INSPECTION SYSTEM

CROSS REFERENCE

This application is the U.S. National Phase under 35 U.S.C. § 371 of International Application No. PCT/JP2018/016095, filed on Apr. 19, 2018, which claims the benefit of Japanese Application No. 2017-112410, filed on Jun. 7, 2017, the entire contents of each are hereby incorporated by reference.

TECHNICAL FIELD

This invention relates to a conveying apparatus and a conveying method for conveying a workpiece to a first imaging position where one surface of the workpiece is imaged, an inversion position where the workpiece is vertically inverted and a second imaging position where the other surface of the workpiece is imaged in this order, and an inspection system for inspecting the workpiece while conveying the workpiece by the conveying apparatus.

The disclosure of Japanese Patent Application enumerated below including specification, drawings and claims is incorporated herein by reference in its entirety: No. 2017-112410 filed on Jun. 7, 2017.

BACKGROUND

Various inspection apparatuses are provided to inspect an inspection object (hereinafter, referred to as a "workpiece") having a three-dimensional shape such as a connecting rod or hub used in a driving unit of an automotive vehicle. For example, an inspection apparatus described in patent literature 1 is provided with two inspection units and one posture changing mechanism. One of the two inspection units images the front surface (one surface) of a workpiece from many directions. After this imaging is completed, the posture changing mechanism receives the workpiece and vertically inverts the workpiece. Thereafter, the inverted workpiece is transferred to the other inspection unit and this inspection unit images the back surface (other surface) of the workpiece from many directions. The appearance of the workpiece is inspected based on many images obtained by the above imaging.

CITATION LIST

Patent Literature

[Patent literature 1] JP2017-15421A

SUMMARY

Technical Problem

In the inspection apparatus configured as described above, a plurality of workpieces are simultaneously present during an operation, and the conveyance by the conveying apparatus, the inspection by the inspection units and the workpiece inversion by the posture changing mechanism are performed in parallel for each workpiece, whereby a tack time is improved.

Here, a moving speed of the workpieces needs to be further increased for further improvement of the tact time. However, since the workpieces are metal products such as connecting rods and relatively heavy, it is difficult to increase the moving speed merely by enhancing the capacity of a drive source such as a motor for workpiece conveyance. Thus, a technique is desired which can further improve throughput by efficiently conveying a plurality of workpieces in parallel to a first imaging position for imaging the front surface of the workpiece, an inversion position for vertically inverting the workpiece and a second imaging position for imaging the back surface of the workpiece in this order.

This invention was developed in view of the above problem and aims to provide a conveying technique capable of efficiently conveying a plurality of workpieces in parallel to a first imaging position, an inversion position and a second imaging position in this order and an inspection system capable of inspecting workpieces with excellent throughput using the conveying technique.

Solution to Problem

A first aspect of the present invention is a conveying apparatus for conveying workpieces to a first imaging position where one surface of the workpiece is imaged with the one surface of the workpiece faced up, an inversion position where the workpiece is vertically inverted and a second imaging position where another surface of the workpiece is imaged with the other surface of the workpiece faced up in this order, the apparatus comprising: a first mover that moves the workpiece between a first transfer position facing the first imaging position and the first imaging position; a second mover that moves the workpiece between a second transfer position facing the inversion position and the inversion position; a third mover that moves the workpiece between a third transfer position facing the second imaging position and the second imaging position; a first feeder that feeds the workpiece from the first transfer position to the second transfer position; and a second feeder that feeds the workpiece from the second transfer position to the third transfer position, wherein: the workpiece having the one surface imaged and the vertically inverted workpiece are respectively defined as an upstream workpiece and a downstream workpiece, a movement of the upstream workpiece to the first transfer position by the first mover and a movement of the downstream workpiece to the second transfer position by the second mover are performed in synchronization; a feed of the upstream workpiece from the first transfer position to the second transfer position by the first feeder and a feed of the downstream workpiece from the second transfer position to the third transfer position by the second feeder are performed in synchronization; and a movement of the upstream workpiece from the second transfer position to the inversion position by the second mover and a movement of the downstream workpiece from the third transfer position to the second imaging position by the third mover are performed in synchronization.

A second aspect of the present invention is a conveying method for conveying workpieces to a first imaging position where one surface of the workpiece is imaged with the one surface of the workpiece faced up, an inversion position where the workpiece is vertically inverted and a second imaging position where another surface of the workpiece is imaged with the other surface of the workpiece faced up in this order, the method comprising: a first step of moving the inverted workpiece as a downstream workpiece to a second transfer position facing the inversion position in synchronization with a movement of the workpiece having the one surface imaged as an upstream workpiece to a first transfer position facing the first imaging position; a second step of feeding the downstream workpiece from the second transfer position to a third transfer position facing the second imaging position in synchronization with a feed of the upstream workpiece from the first transfer position to the second transfer position; and a third step of moving the downstream workpiece from the third transfer position to the second imaging position in synchronization with a movement of the upstream workpiece from the second transfer position to the inversion position, wherein the first step, the second step and the third step are successively performed in this order.

A third aspect of the present invention is an inspection system, the system comprising: a first imaging device that images one surface of a workpiece with the one surface of the workpiece faced up; an inverting device that vertically inverts the workpiece; a second imaging device that images another surface of the workpiece with the other surface of the workpiece faced up; the conveying apparatus, and wherein an inspection apparatus that inspects the workpiece based on a plurality of images captured by the first imaging device and the second imaging device.

In the invention thus configured, the conveyance of the upstream workpiece from the first imaging position to the inversion position is composed of (a-1) a moving operation from the first imaging position to the first transfer position, (a-2) a feeding operation from the first transfer position to the second transfer position and (a-3) a moving operation from the second transfer position to the inversion position. On the other hand, the conveyance of the downstream workpiece from the inversion position to the second imaging position is composed of (b-1) a moving operation from the inversion position to the second transfer position, (b-2) a feeding operation from the second transfer position to the third transfer position and (b-3) a moving operation from the third transfer position to the second imaging position. The above moving operations (a-1), (b-1) are performed in synchronization, the above feeding operations (a-2), (b-2) are performed in synchronization and the above moving operations (a-3), (b-3) are performed in synchronization. Thus, two workpieces (upstream workpiece and downstream workpiece) are efficiently conveyed in parallel. In addition, since the moving operations and the feeding operations are simple operations, each operation can be easily speeded up and a time required for workpiece conveyance can be shortened as compared to a conventional technique for conveying workpieces while linking a plurality of operations.

Advantageous Effects of Invention

As described above, according to the invention, the vertically inverted workpiece is moved as the downstream workpiece to the second transfer position facing the inversion position in synchronization with the movement of the workpiece having the one surface imaged as the upstream workpiece to the first transfer position facing the first imaging position. Further, the downstream workpiece is fed from the second transfer position to the third transfer position facing the second imaging position in synchronization with the feed of the upstream workpiece from the first transfer position to the second transfer position. Furthermore, the downstream workpiece is moved from the third transfer position to the second imaging position in synchronization with the movement of the upstream workpiece from the second transfer position to the inversion position. Thus, a plurality of workpieces can be efficiently conveyed in parallel. In addition, the workpieces can be inspected with excellent throughput by applying this conveying technique to the inspection system.

All of a plurality of constituent elements of each aspect of the invention described above are not essential, and some of the plurality of constituent elements can be changed, deleted, replaced by new other constituent elements or have limited contents partially deleted as appropriate to partially or entirely solve the aforementioned problem or to achieve some or all of effects described in this specification. Further, to partially or entirely solve the aforementioned problem or to achieve some or all of the effects described in this specification, some or all of technical features included in one aspect of the invention described above can be combined with some or all of technical features included in another aspect of the invention described above into one independent aspect of the invention.

DESCRIPTION OF EMBODIMENT

Figure 1:
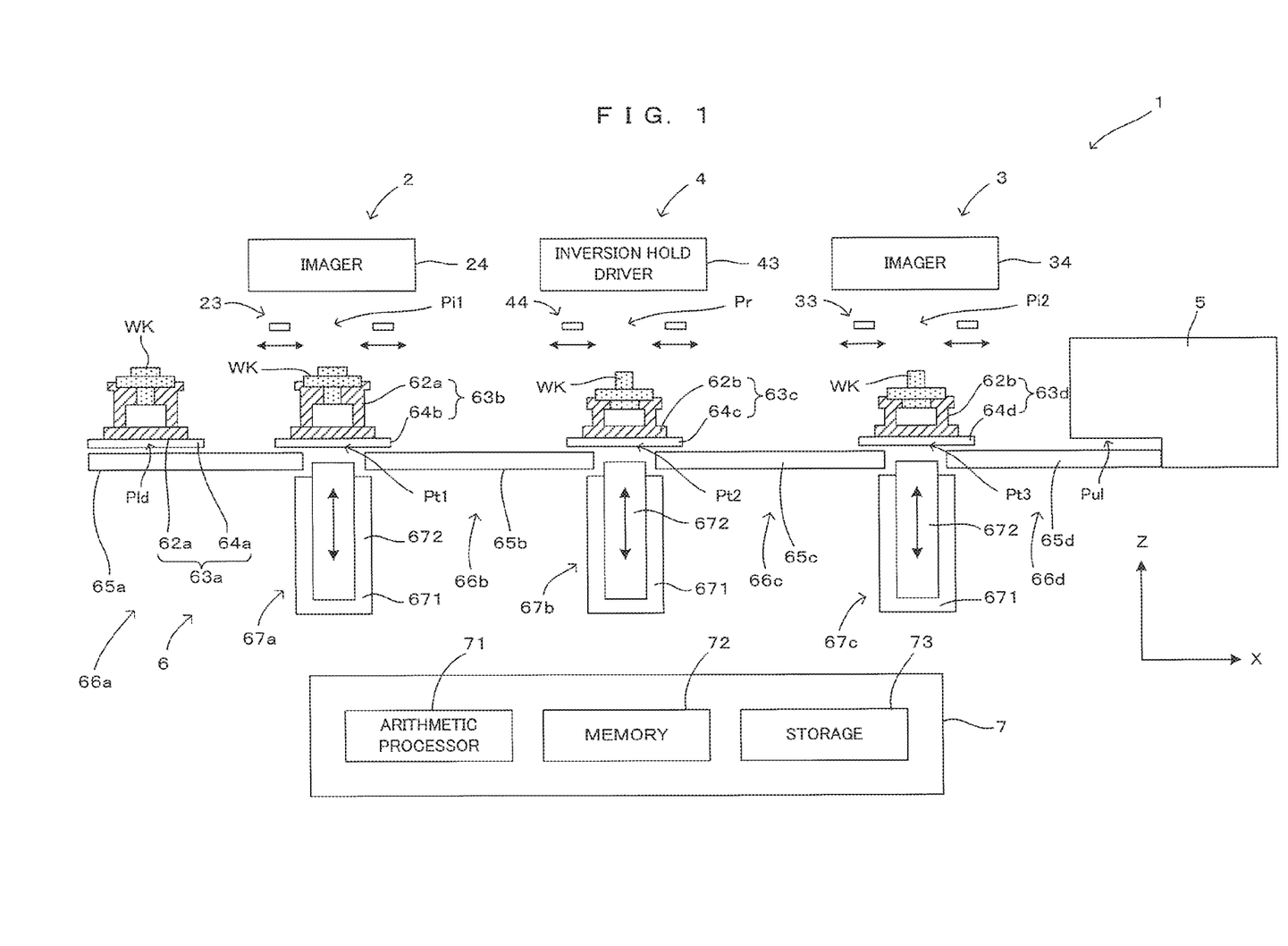
FIG. 1 is a diagram schematically showing an overall configuration of an inspection system equipped with one embodiment of a conveying apparatus according to the invention.
Figure 2:
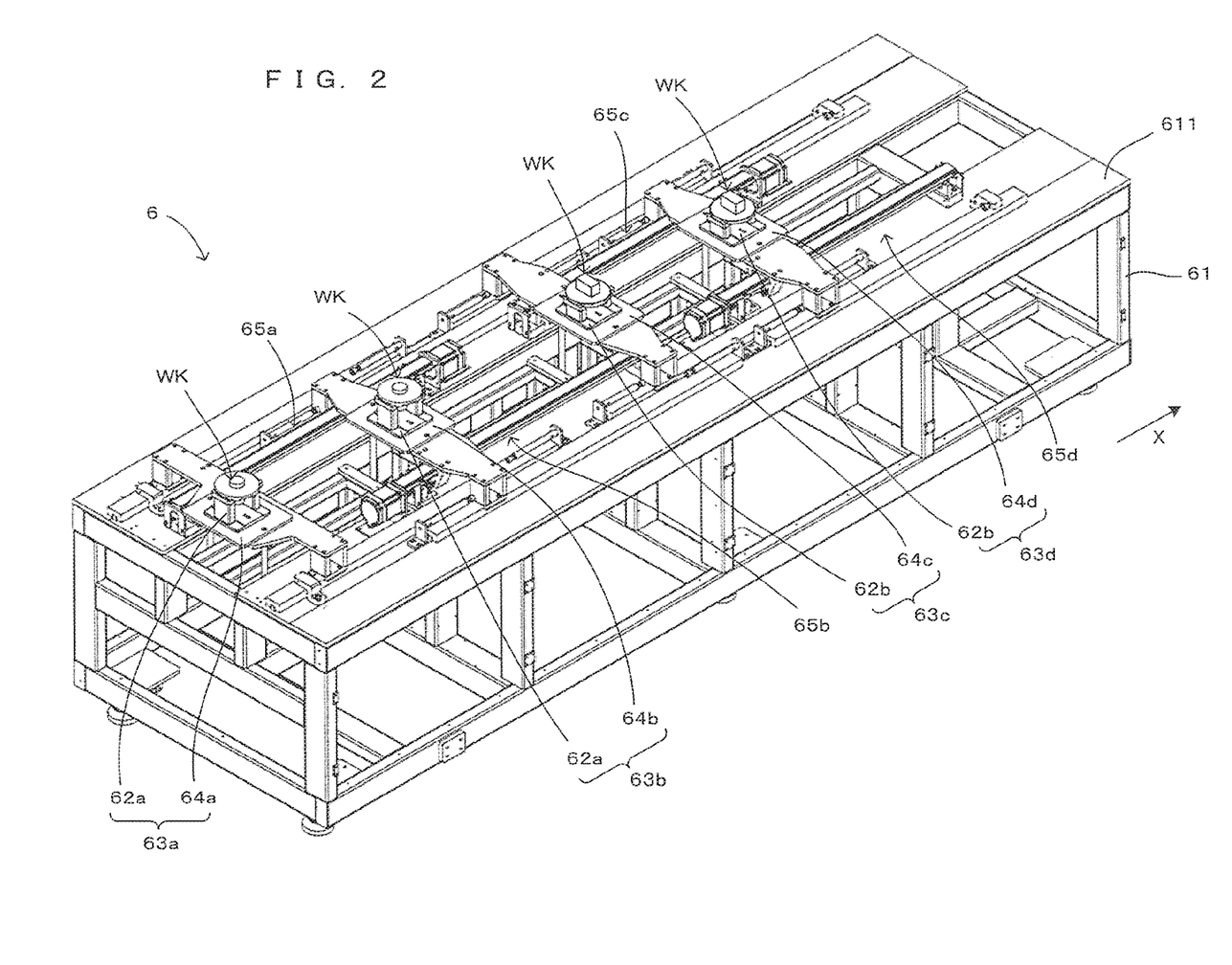
FIG. 2 is a perspective view showing the configuration of the conveying apparatus.
Figure 3:
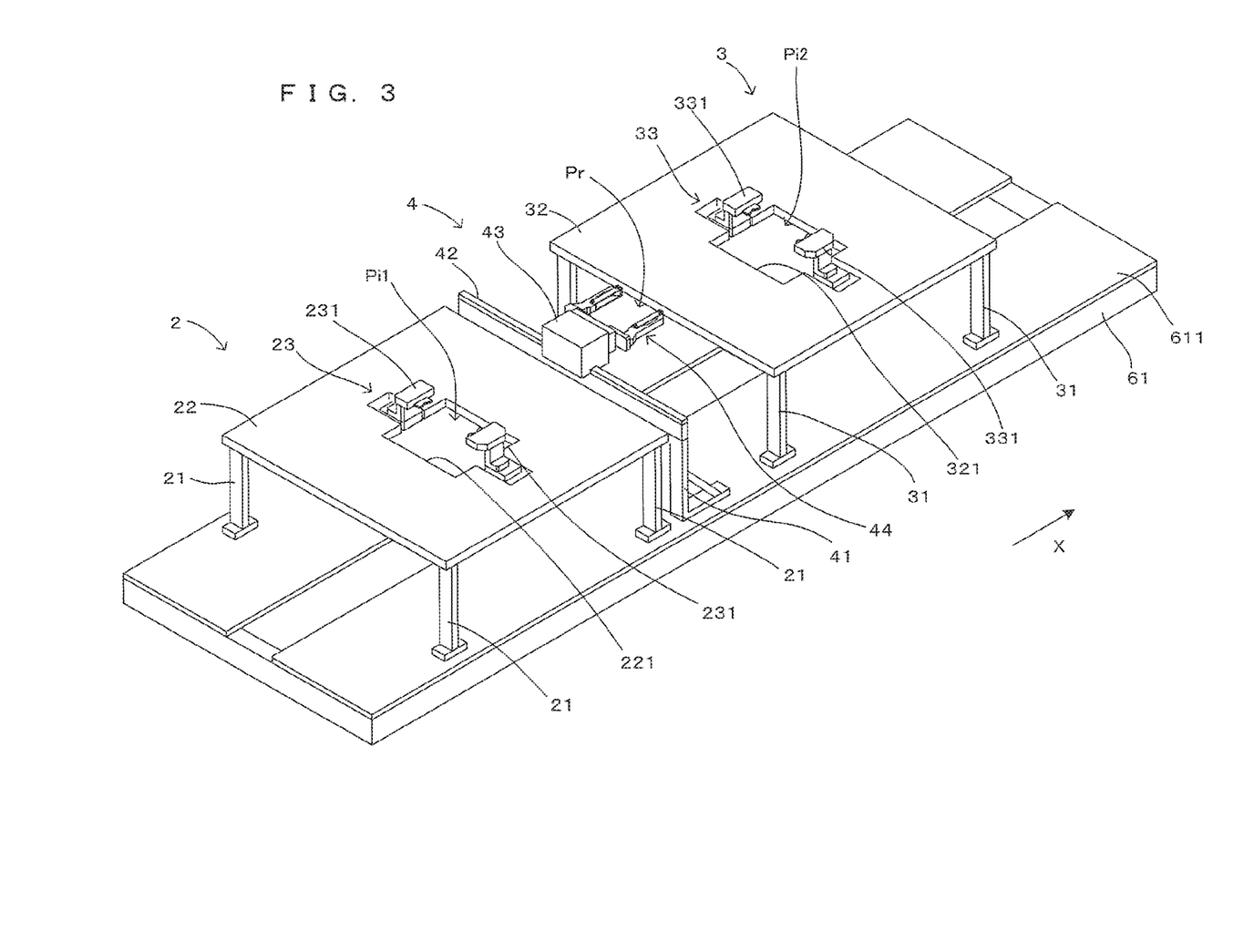
FIG. 3 is a perspective view showing parts of imaging devices and an inverting device provided in the inspection system of FIG. 1.
Figure 4:
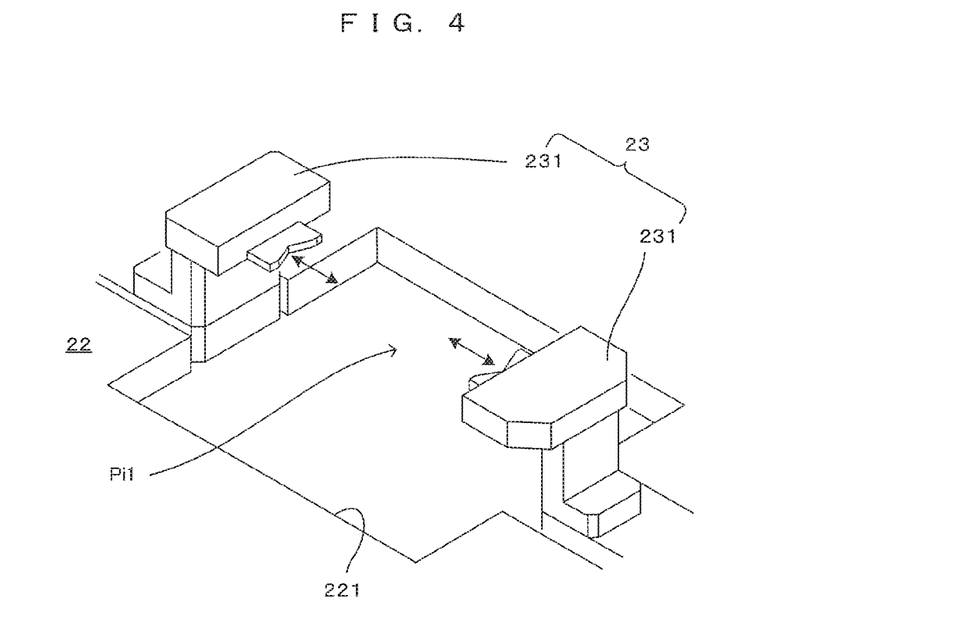
FIG. 4 is a perspective view showing a holder provided in the imaging device.
Figure 5:
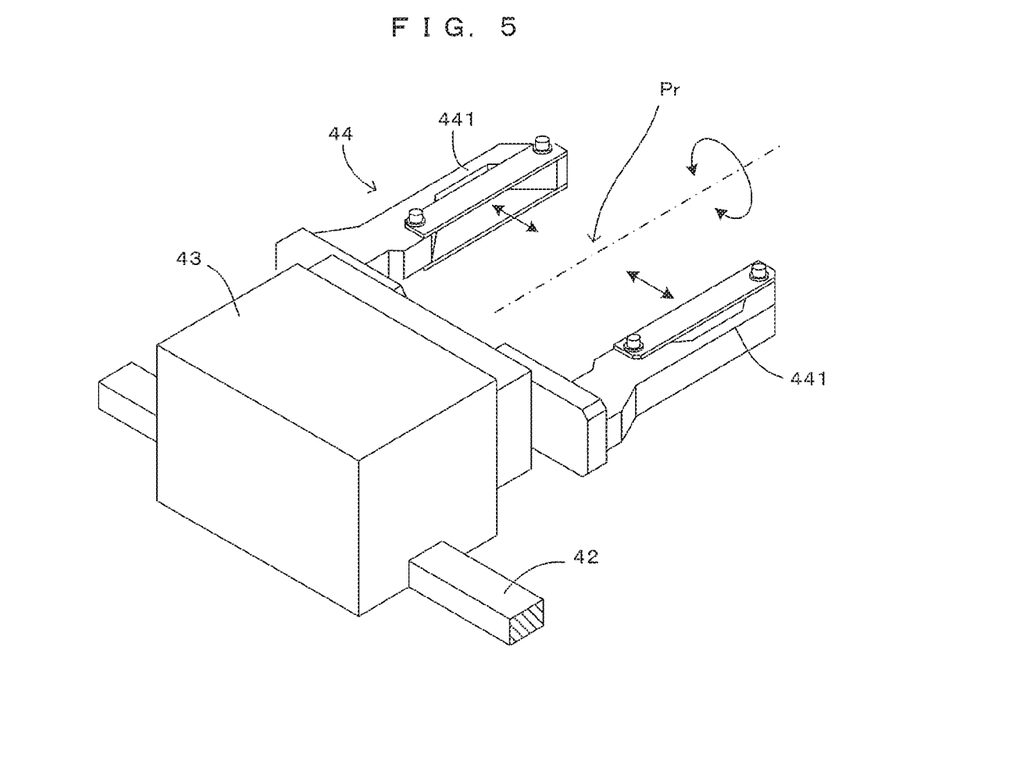
FIG. 5 is a perspective view showing a holder provided in the inverting device.

FIG. 1 is a diagram schematically showing an overall configuration of an inspection system equipped with one embodiment of a conveying apparatus according to the invention. FIG. 2 is a perspective view showing the configuration of the conveying apparatus. FIG. 3 is a perspective view showing parts of imaging devices and an inverting device provided in the inspection system of FIG. 1. FIG. 4 is a perspective view showing a holder provided in the imaging device. FIG. 5 is a perspective view showing a holder provided in the inverting device. Note that workpieces WK and work tables are respectively dotted and hatched to be visually distinguished in FIG. 1 (and also in FIGS. 8 and 9 to be described later). This inspection system 1 includes two imaging devices (front surface imaging device 2, back surface imaging device 3), an inverting device 4, a sorting/discharging device 5, a conveying apparatus 6 for conveying the workpieces WK to these devices 2 to 5, and a control device 7 for controlling each part of the system.

The front surface imaging device 2 includes four column members 21 standing from an upper surface 611 of a conveying base 61 (see FIG. 2) of the conveying apparatus 6, a base member 22 in the form of a flat plate supported by the column members 21, a holder 23 mounted on the base member 22 and an imager 24 (FIG. 1) for imaging the front surface of the workpiece WK held in the holder 23. As shown in FIG. 4, the holder 23 includes a pair of chuck members 231, 231 arranged across an opening 221 provided in a central part of the base member 22. The chuck members 231, 231 can grip the workpiece WK conveyed to a front surface imaging position Pi1 via a loading position Pld and an upstream transfer position Pt1 by the conveying apparatus 6 as described in detail later by being driven by a chuck driving mechanism (not shown). That is, the workpiece WK conveyed to the front surface imaging position Pi1 via the opening 221 is horizontally sandwiched by the pair of chuck members 231, 231, whereby the workpiece WK is held at the front surface imaging position Pi1. On the other hand, the workpiece WK can be released by separating the pair of chuck members 231, 231 from each other by the chuck driving mechanism.

Then, the front surface imaging device 2 images the front surface (one surface) of the workpiece WK from many directions by the imager 24 while the workpiece WK is held by the holder 23 at the front surface imaging position Pi1. Note that a configuration similar to that described in patent literature 1 can be, for example, employed as the imager 24.

A plurality of images captured by the imager 24 in this way are sent to the control device 7 and an inspection is performed for the front surface (reference sign WKa in FIGS. 6A and 6B) of the workpiece WK based on the plurality of images. On the other hand, the workpiece WK after imaging is conveyed to an inversion position Pr via the upstream transfer position Pt1 and a central transfer position Pt2 by the conveying apparatus 6 and vertically inverted by the inverting device 4.

The inverting device 4 includes two column members 41 standing from the upper surface 611 of the conveying base 61 on a side downstream (right side in FIG. 1) of the front surface imaging device 2 in a longitudinal direction X of the conveying base 61, a coupling member 42 coupling the upper ends of the column members 41, an inversion hold driver 43 attached to the coupling member 42 and an inversion holder 44 rotatably supported on the inversion hold driver 43. As shown in FIG. 5, the inversion holder 44 includes a pair of chuck members 441, 441 arranged to face each other. The chuck members 441, 441 can grip the workpiece WK conveyed to the inversion position Pr by the conveying apparatus 6 as described in detail later. That is, the workpiece WK conveyed to the inversion position Pr is horizontally sandwiched by the pair of chuck members 441, 441, whereby the workpiece WK is held at the inversion position Pr. Further, the pair of chuck members 441, 441 holding the workpiece WK are turned 180° by the inversion hold driver 43, whereby the workpiece WK is vertically inverted. On the other hand, the pair of chuck members 441, 441 are separated from each other by the inversion hold driver 43, whereby the workpiece WK can be released. The workpiece WK vertically inverted by the inverting device 4 thus configured is conveyed to a back surface imaging position Pi2 via the central transfer position Pt2 and a downstream transfer position Pt3 by the conveying apparatus 6, and imaged by the back surface imaging device 3.

The back surface imaging device 3 basically has the same configuration as the front surface imaging device. Accordingly, the same components are denoted by equivalent reference signs and not described. This back surface imaging device 3 images the back surface (other surface) of the workpiece WK from many directions by an imager 34 while holding the workpiece WK at the back surface imaging position Pi2 by a holder 33. A plurality of images captured in this way are sent to the control device 7 and an inspection is performed for the back surface of the workpiece WK based on the plurality of images. On the other hand, the workpiece WK after imaging is conveyed to an unloading position Pu1 via the downstream transfer position Pt3 by the conveying apparatus 6. At this unloading position Pu1, the sorting/discharging device 5 discharges the inspected workpiece WK from the inspection system 1 while sorting the workpiece WK into a good product or defective product.

Figure 6A:
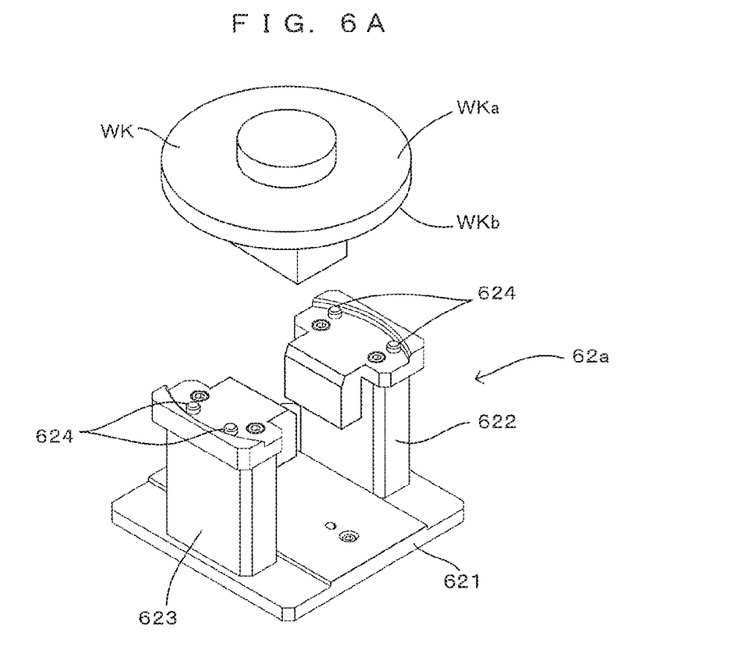
FIG. 6A is a perspective view showing the configuration of a face-up work table for supporting the workpiece in a face-up state.
Figure 6B:
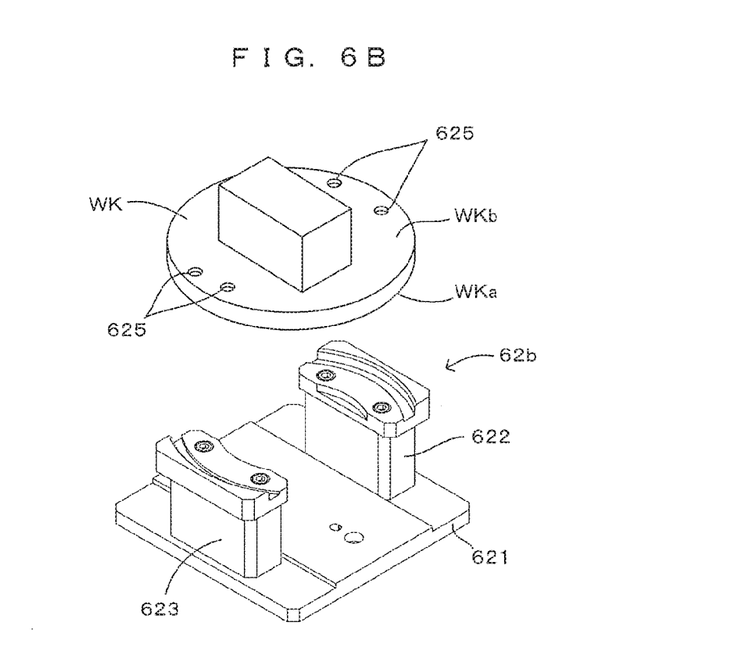
FIG. 6B is a perspective view showing the configuration of a face-down work table for supporting the workpiece in a face-down state.

Next, the configuration of the conveying apparatus 6 is described with reference to FIGS. 1, 2, 6A and 6B. FIG. 6A is a perspective view showing the configuration of a face-up work table for supporting the workpiece in a face-up state, and FIG. 6B is a perspective view showing the configuration of a face-down work table for supporting the workpiece in a face-down state. The face-up work table (hereinafter, referred to as a "FU work table 62a") is such that two columns 622, 623 standing from a base member 621 as shown in FIG. 6A. The back surface WKb of the workpiece WK can be supported from below on the upper surface of each column 622, 623. Further, two positioning pins 624 stand on the upper surface of each column 622, 623 to be insertable into and withdrawable from recesses 625 (see FIG. 6B) provided in the back surface WKb of the workpiece WK. Thus, if the workpiece WK is placed on the upper surfaces of the columns 622, 623 while causing the recesses 625 to face the positioning pins 624, the workpiece WK is positioned and supported on the FU work table 62a with the front surface WKa of the workpiece WK faced up as shown in FIG. 2.

The other face-down work table (hereinafter, referred to as a "FD work table 62b") is such that two columns 622, 623 standing from a base member 621 similarly to the FU work table 62a as shown in FIG. 6B. The upper surface of each column 622, 623 is finished into a shape engageable with the front surface WKa of the workpiece WK. Thus, by placing the front surface WKa of the workpiece WK on the upper surfaces of the columns 622, 623, the workpiece WK is positioned and supported on the FD work table 62b with the back surface WKb of the workpiece WK faced up as shown in FIG. 2.

In the conveying apparatus 6, four stages 63a to 63d are aligned in an X direction on the conveying base 61 extending in the X direction. Out of these, the stage 63a is so structured that the FU work table 62a is held by a base member 64a. An X-driver 65a operates in accordance with an instruction from the control device 7, whereby the stage 63a reciprocates along the X direction between the loading position Pld and the upstream transfer position Pt1. Thus, the workpiece WK in the face-up state can be fed to the upstream transfer position Pt1 while being supported by the FU work table 62a, and the FU work table 62a in an empty state can be returned to the loading position Pld. As just described, in this embodiment, the stage 63a and the X-driver 65a function as a feeder 66a for feeding the workpiece WK from the loading position Pld to the upstream transfer position Pt1. Note that, in this embodiment, the upstream transfer position Pt1 is set vertically right below the front surface imaging position Pi1 and the other transfer positions Pt2, Pt3 are also respectively set vertically right below the inversion position Pr and the back surface imaging position Pi2. Further, in this embodiment, a driver as a combination of a rotary motor and a ball screw mechanism, a driver including a linear motion mechanism using a linear motor or the like can be used as the X-driver 65*a*. This point similarly applies to X-drivers 65*b* to 65*d* described next.

The X-driver 65*b* is provided downstream of the X-driver 65*a* in the X direction and reciprocates the stage 63*b* holding the FU work table 62*a* by a base member 64*b* along the X direction between the upstream transfer position Pt1 and the central transfer position Pt2. Thus, the workpiece WK in the face-up state can be fed to the central transfer position Pt2 while being supported by the FU work table 62*a*, and the FU work table 62*a* in the empty state can be returned to the upstream transfer position Pt1. As just described, in this embodiment, the stage 63*b* and the X-driver 65*b* function as a feeder 66*b* for feeding the workpiece WK from the upstream transfer position Pt1 to the central transfer position Pt2.

Further, the X-drivers 65*c*, 65*d* are arranged similarly to the X-drivers 65*a*, 65*b*, following the X-driver 65*b*. That is, the X-driver 65*c* is provided downstream of the X-driver 65*b* in the X direction and reciprocates the stage 63*c* holding the FD work table 62*b* by a base member 64*c* along the X direction between the central transfer position Pt2 and the downstream transfer position Pt3. Thus, the workpiece WK in the face-down state can be fed to the downstream transfer position Pt3 while being supported by the FD work table 62*b*, and the FD work table 62*b* in the empty state can be returned to the central transfer position Pt2. As just described, in this embodiment, the stage 63*c* and the X-driver 65*c* function as a feeder 66*c* for feeding the workpiece WK from the central transfer position Pt2 to the downstream transfer position Pt3.

Furthermore, the X-driver 65*d* is provided downstream of the X-driver 65*c* in the X direction and reciprocates the stage 63*d* holding the FD work table 62*b* by a base member 64*d* along the X direction between the downstream transfer position Pt3 and the unloading position Pu1. Thus, the workpiece WK in the face-down state can be fed to the unloading position Pu1 while being supported by the FD work table 62*b*, and the FD work table 62*b* in the empty state can be returned to the downstream transfer position Pt3. As just described, in this embodiment, the stage 63*d* and the X-driver 65*d* function as a feeder 66*d* for feeding the workpiece WK from the downstream transfer position Pt3 to the unloading position Pu1.

Further, in the conveying apparatus 6, three elevating mechanisms 67*a* to 67*c* are respectively disposed at the transfer positions Pt1 to Pt3 as shown in FIG. 1. Each elevating mechanism 67*a* to 67*c* includes a guide member 671 standing in a vertical direction Z inside the conveying base 61, a slide member 672 provided freely movably in the Z direction along the guide member 671 and a Z-driver (not shown) having a linear motion mechanism for moving the slide member 672 in the vertical direction Z.

In the elevating mechanism 67*a*, the Z-driver operates in accordance with an instruction from the control device 7, whereby the stage 63*a* moves in the Z direction between the upstream transfer position Pt1 and the front surface imaging position Pi1 and the workpiece WK is transferred to the front surface imaging device 2. Specifically, with the stage 63*a* holding the workpiece WK located at the upstream transfer position Pt1, the slide member 672 retracted inside the conveying base 61 moves upward along the guide member 671, whereby the workpiece WK is positioned at the front surface imaging position Pi1. By moving the slide member 672 downward along the guide member 671 after the workpiece WK is held by the holder 23 of the front surface imaging device 2, the FU work table 62*a* in the empty state can be returned to the upstream transfer position Pt1 together with the base member 64*a*.

Further, the other stage 63*b* moves in the Z direction between the upstream transfer position Pt1 and the front surface imaging position Pi1, whereby the workpiece WK is transferred from the front surface imaging device 2. Specifically, with the stage 63*b* including the FU work table 62*a* in the empty state located at the upstream transfer position Pt1, the slide member 672 retracted inside the conveying base 61 moves upward along the guide member 671, whereby the stage 63*b* is positioned at the front surface imaging position Pi1. In this way, the workpiece WK having the front surface imaged is supported on the stage 63*b*. Thereafter, the workpiece WK is released from the holder 23 and the transfer of the workpiece WK to the stage 63*b* is completed. Subsequently, the slide member 672 moves downward, whereby the workpiece WK is returned to the upstream transfer position Pt1 while being supported on the stage 63*b* and is further fed from the upstream transfer position Pt1 to the central transfer position Pt1 by the feeder 66*b*.

At this central transfer position Pt2, the elevating mechanism 67*b* is provided and the Z-driver operates in accordance with an instruction from the control device 7, whereby the stage 63*b* moves in the Z direction between the central transfer position Pt2 and the inversion position Pr and the workpiece WK is transferred to the inverting device 4. Specifically, with the stage 63*b* holding the workpiece WK located at the central transfer position Pt2, the slide member 672 retracted inside the conveying base 61 moves upward along the guide member 671, whereby the workpiece WK is positioned at the inversion position Pr. By moving the slide member 672 downward along the guide member 671 after the workpiece WK is held by the inversion holder 44 of the inverting device 4, the FU work table 62*a* in the empty state can be returned to the central transfer position Pt2 together with the base member [[64*a*]]64*b*.

Further, the other stage 63*c* moves in the Z direction between the central transfer position Pt2 and the inversion position Pr, whereby the workpiece WK is transferred from the inverting device 4. Specifically, with the stage 63*c* including the FD work table 62*b* in the empty state located at the central transfer position Pt2, the slide member 672 retracted inside the conveying base 61 moves upward along the guide member 671, whereby the stage 63*c* is positioned at the inversion position Pr. In this way, the workpiece WK vertically inverted by the inverting device 4 and set in the face-down state is supported on the stage 63*c*. Thereafter, the workpiece WK is released from the inversion holder 44 and the transfer of the workpiece WK to the stage 63*c* is completed. Subsequently, the slide member 672 moves downward, whereby the workpiece WK is returned to the central transfer position Pt2 while being supported on the stage 63*c* and is further fed from the central transfer position Pt2 to the downstream transfer position Pt3 by the feeder 66*c*.

At this downstream transfer position Pt3, the elevating mechanism 67*c* is provided. The Z-driver operates in accordance with an instruction from the control device 7, whereby the stage 63*c* moves in the Z direction between the downstream transfer position Pt3 and the back surface imaging position Pi2 and the workpiece WK is transferred to the back surface imaging device 3. Specifically, with the stage 63*c* holding the workpiece WK located at the downstream transfer position Pt3, the slide member 672 retracted inside the conveying base 61 moves upward along the guide member 671, whereby the workpiece WK is positioned at the back surface imaging position Pi2. By moving the slide member 672 downward along the guide member 671 after the workpiece WK is held by the holder 33 of the back surface imaging device 3, the FD work table 62b in the empty state can be returned to the downstream transfer position Pt3 together with the base member [[64b]]64c.

Further, the other stage 63d moves in the Z direction between the downstream transfer position Pt3 and the back surface imaging position Pi2, whereby the workpiece WK is transferred from the back surface imaging device 3. Specifically, with the stage 63d including the FD work table 62b in the empty state located at the downstream transfer position Pt3, the slide member 672 retracted inside the conveying base 61 moves upward along the guide member 671, whereby the stage 63d is positioned at the back surface imaging position Pi2. In this way, the workpiece WK having the back surface imaged by the back surface imaging device 3 is supported on the stage 63d. Thereafter, the workpiece WK is released from the holder 33 and the transfer of the workpiece WK to the stage 63d is completed. Subsequently, the slide member 672 moves downward, whereby the workpiece WK is returned to the downstream transfer position Pt3 while being supported on the stage 63d and is further fed from the downstream transfer position Pt3 to the unloading position Pu1 by the feeder 66d.

In the inspection system 1, the control device 7 is provided to control each part of the system. The control device 7 is constituted by a computer including an arithmetic processor 71 such as a known CPU (Central Processing Unit) for performing a logical operation, a memory 72 such as a RAM (Random Access memory), and a storage 73 such as a hard disk drive. A computer program for conveying and inspecting the workpieces WK is installed in the storage 73. A plurality of workpieces WK are efficiently inspected in parallel by controlling each part of the system in accordance with this computer program. An example of an operation by the inspection system 1 is described with reference to FIGS. 7 to 9 below, centered on a conveyance procedure of the workpieces WK by the stages 63a to 63d.

Figure 7:
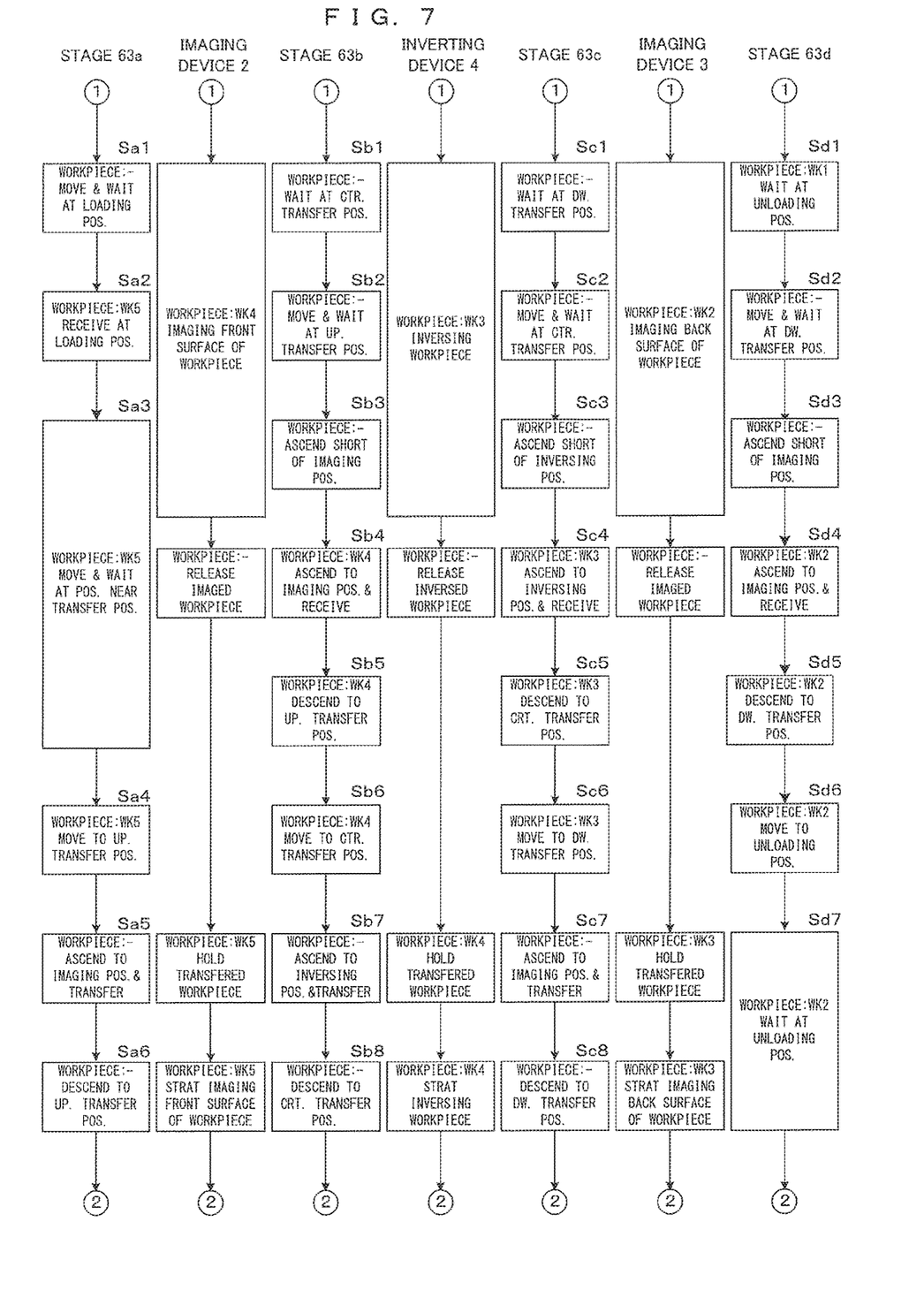
FIG. 7 is a flow chart showing an example of the feeding and inspection of the workpieces in the inspection system shown in FIG. 1.
Figure 8:
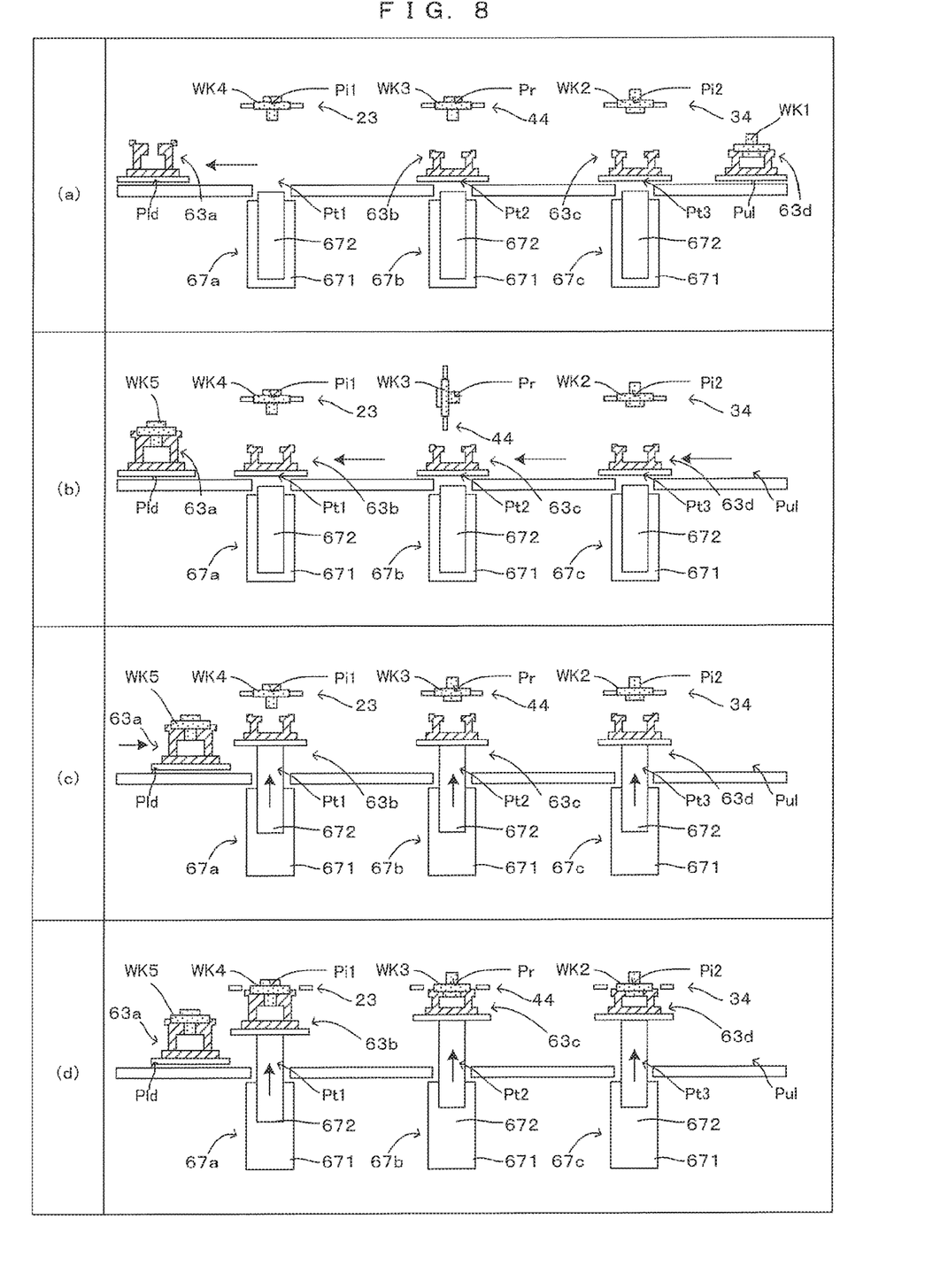
FIGS. 8 and 9 are diagrams schematically showing a workpiece feeding operation and a workpiece inspecting operation.
Figure 9:
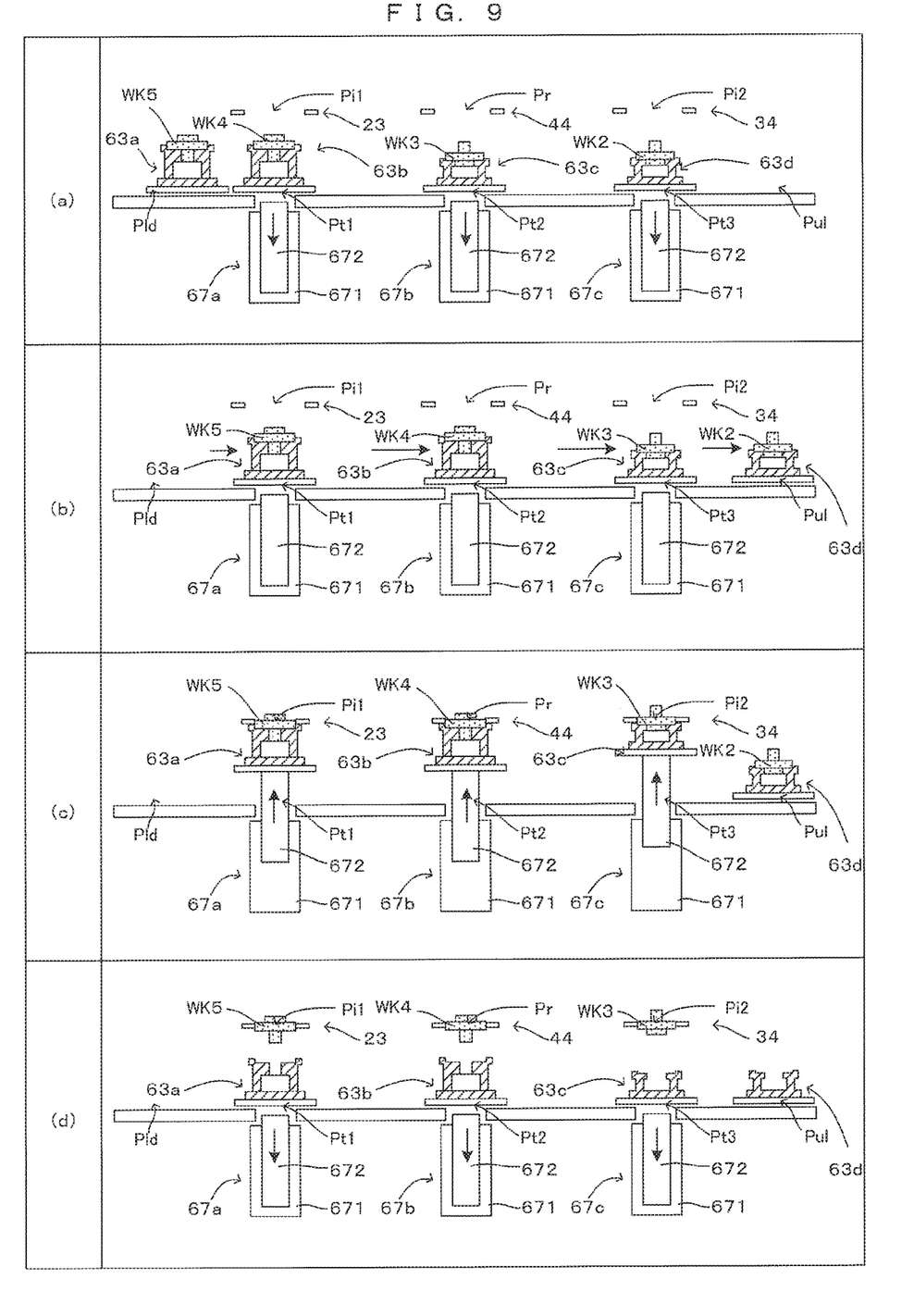

FIG. 7 is a flow chart showing an example of the feeding and inspection of the workpieces in the inspection system shown in FIG. 1. FIGS. 8 and 9 are diagrams schematically showing a workpiece feeding operation and a workpiece inspecting operation. In FIG. 7, the presence or absence of the workpiece and an identification symbol of the workpiece are shown in an upper stage of a box and an operation content is also written. Here, the back surface imaging of a workpiece WK2 by the back surface imaging device 3, the vertical inversion of a workpiece WK3 by the inverting device 4 and the front surface imaging of a workpiece WK4 by the front surface imaging device 2 are started as shown in field (a) of FIG. 8. At that time, the stage 63d holding a workpiece WK1 finished with the inspection is positioned at the unloading position Pu1 and waiting to be sorted and discharged by the sorting/discharging device 5 (Step Sd1). Further, the stage 63a is moved in the empty state from the upstream transfer position Pt1 to the loading position Pld as indicated by an arrow in FIG. 8 and waits until a next workpiece WK5 is carried in (Step Sa1). Furthermore, the stages 63b, 63c in the empty state are respectively waiting at the central transfer position Pt2 and the downstream transfer position Pt3 (Steps Sb1, Sc1).

The stage 63a receives the next workpiece WK5 (Step Sa2) while the back surface imaging of the workpiece WK2 by the back surface imaging device 3, the vertical inversion of the workpiece WK3 by the inverting device 4 and the front surface imaging of the workpiece WK4 by the front surface imaging device 2 are being performed. Further, as shown by arrows in field (b) of FIG. 8, the stages 63b to 63d respectively move to the upstream transfer position Pt1, the central transfer position Pt2 and the downstream transfer position Pt3 and wait (Steps Sb2, Sc2, Sd2). After the back surface imaging, the vertical inversion and the front surface imaging, the stage 63a holding the new workpiece WK5 moves to a position near the upstream transfer position Pt1 and waits (Step Sa3) as shown by an arrow in field (c) of FIG. 8. Further, the stage 63b is moved upward to a position immediately preceding the front surface imaging position Pi1 by the elevating mechanism 67a and waits (Step Sb3). Further, the stage 63c is moved upward to a position immediate before the inversion position Pr by the elevating mechanism 67b and waits (Step Sc3). Furthermore, the stage 63d is moved upward to a position immediate before the back surface imaging position Pi2 by the elevating mechanism 67c and waits (Step Sd3).

When the front surface imaging, the vertical inversion and the back surface imaging are completed, the stages 63b to 63d move upward respectively to the front surface imaging position Pi1, the inversion position Pr and the back surface imaging position Pi2 and receive and support the workpieces WK4, WK3 and WK2 (Steps Sb4, Sc4, Sd4) as shown by arrows in field (d) of FIG. 8. After these workpieces are supported, the workpiece WK4 finished with the imaging is released from the holder 23, the workpiece WK3 finished with the inversion is released from the inversion holder 44 and the workpiece WK2 finished with the imaging is released from the holder 33. In this way, the transfer of the workpieces WK4, WK3 and WK2 to the stags 63b to 63d is completed.

Subsequently, as shown by arrows in field (a) of FIG. 9, the stages 63b to 63d respectively move downward to the upstream transfer position Pt1, the central transfer position Pt2 and the downstream transfer position Pt3 (Steps Sb5, Sc5, Sd5). Further, as shown by arrows in field (b) of FIG. 9, the stages 63a to 63d respectively move to the upstream transfer position Pt1, the central transfer position Pt2, the downstream transfer position Pt3 and the unloading position Pu1 (Steps Sa4, Sb6, Sc6, Sd6). Furthermore, as shown by arrows in field (c) of FIG. 9, the stages 63a to 63c respectively move upward to the front surface imaging position Pi1, the inversion position Pr and the back surface imaging position Pi2 (Steps Sa5, Sb7, Sc7). Further, immediately after upward movements are completed, the workpiece WK5 is held by the holder 23 and the transfer of the workpiece WK5 to the front surface imaging device 2 is completed as shown in field (d) of FIG. 9. Further, the workpiece WK4 is held by the inversion holder 44 and the transfer of the workpiece WK4 to the inverting device 4 is completed. Furthermore, the workpiece WK3 is held by the holder 33 and the transfer of the workpiece WK3 to the back surface imaging device 3 is completed. Note that the stage 63d waits at the unloading position Pu1 while the sorting and discharge are performed by the sorting/discharging device 5 in parallel with these workpiece holding operations.

When preparations for the front surface imaging of the workpiece WK5, the vertical inversion of the workpiece WK4 and the back surface imaging of the workpiece WK3 are completed in this way, the stages 63a to 63c start moving downward (Steps Sa6, Sb8, Sc8), the front surface imaging of the workpiece WK5 by the front surface imaging device 2 and the vertical inversion of the workpiece WK4 by the inverting device 4 are started, and return is made to the initial Steps Sa1, Sb1, Sc1, Sd1 to continue a series of the operations described above.

As described above, in this embodiment, the vertically inverted workpiece WK3 (corresponding to an example of a "downstream workpiece" of the invention) is moved from the inversion position Pr to the central transfer position Pt2 (corresponding to an example of a "second transfer position" of the invention) in synchronization with a movement of the workpiece WK4 (corresponding to an example of an "upstream workpiece" of the invention) having the front surface already imaged from the front surface imaging position Pi1 (corresponding to an example of a "first imaging position" of the invention) to the upstream transfer position Pt1 (corresponding to an example of a "first transfer position" of the invention), for example, as shown in FIG. 7, field (d) of FIG. 8 and fields (a) to (c) of FIG. 9. Subsequently, the workpiece WK3 is fed from the central transfer position to the downstream transfer position (corresponding to an example of a "third transfer position" of the invention) in synchronization with the feed of the workpiece WK4 from the upstream transfer position Pt1 to the central transfer position Pt2. Further, the workpiece WK3 is moved from the downstream transfer position to the back surface imaging position Pi2 (corresponding to an example of a "second imaging position" of the invention) in synchronization with a movement of the workpiece WK4 from the central transfer position Pt2 to the inversion position Pr. Thus, the plurality of workpieces WK can be efficiently conveyed in parallel. In addition, the workpieces can be inspected with excellent throughput by applying this conveying technique to the inspection system 1.

Further, in this embodiment, not only the conveyance of the workpieces WK between adjacent ones of the front surface imaging device 2, the inverting device 4 and the back surface imaging device 3, but also the conveyance of an unprocessed workpiece WK (corresponding to the workpiece WK5 in FIGS. 7 and 8) to the upstream transfer position Pt1 and the conveyance of the processed workpiece WK (corresponding to the workpiece WK1 in FIGS. 7 and 8) to the unloading position Pu1 are also performed in synchronization with the feeding and moving operations of the workpieces. Thus, the workpieces WK can be successively conveyed and the inspection can be continued with high throughput without reducing conveyance efficiency.

Further, in the above embodiment, the workpieces WK are not conveyed as they are, but the workpieces WK are conveyed using the work tables 62a, 62b conforming to the workpieces WK. Thus, the workpieces WK can be stably conveyed. Further, the workpieces WK can be reliably and stably held and released by the holder 23 of the front surface imaging device 2, the inversion holder 44 of the inverting device 4 and the holder 33 of the back surface imaging device 3. Further, in this embodiment, not the work tables 62a, 62b holding the workpieces WK, but the stages 63a to 63d configured to support the work tables 62a, 62b by the base members 64a to 64d are fed and moved. Thus, the workpieces WK can be fed without being affected by the types and shapes of the workpieces WK and the work tables 62a, 62b, and versatility is excellent.

Further, in the above embodiment, the transfer positions Pt1 to Pt3 are respectively positions vertically right below the front surface imaging position Pi1, the inversion position Pr and the back surface imaging position Pi2. That is, as is clear from FIGS. 1 to 3, the inspection system 1 has such a stacking structure that the front surface imaging device 2, the inverting device 4 and the back surface imaging device 3 are stacked vertically above the conveying apparatus 6. As a result, a footprint of the inspection system 1 can be suppressed.

Further, the workpieces WK are two-dimensionally conveyed by combining the feed in the X direction by the X-drivers 65a to 65d and upward and downward movements in the Z direction by the elevating mechanisms 67a to 67c. A so-called linear motion mechanism is used in any drive, and the moving operations and the feeding operations of the workpieces WK are simple operations. Thus, each operation can be easily speeded up and a conveying speed can be improved as a whole. As a result, a time required for workpiece conveyance can be shortened.

As described above, in this embodiment, the front surface WKa and the back surface WKb of the workpiece WK respectively correspond to examples of "one surface of a workpiece" and "another surface of the workpiece" of the invention. Further, the stages 63a, 63b and the elevating mechanism 67a function as a "first mover" of the invention, the stages 63b, 63c and the elevating mechanism 67b function as a "second mover" of the invention, and the stages 63c, 63d and the elevating mechanism 67c function as a "third mover" of the invention. Further, the feeders 66a to 66d respectively function as a "loading unit", a "first feeder", a "second feeder" and a "unloading unit". Further, the front surface imaging device 2 and the back surface imaging device 3 respectively correspond to examples of a "first imaging device" and a "second imaging device" of the invention.

Note that the invention is not limited to the above embodiment and various changes other than those described above can be made without departing from the gist of the invention. For example, although the workpieces WK are conveyed while being supported by the stages 63a to 63d in the above embodiment, the workpieces WK may be conveyed while being supported by the work tables 62a, 62b or may be singly conveyed.

Further, although the loading position Pld, the transfer positions Pt1 to Pt3 and the unloading position Pu1 are linearly arranged in the above embodiment, an arrangement pattern is not limited to this. For example, these positions may be arranged substantially in an L shape in a plan view.

Further, although the front surface imaging device 2, the inverting device 4 and the back surface imaging device 3 are arranged vertically above the conveying apparatus 6 in the above embodiment, the arrangement of those is not limited to this. For example, some or all of the front surface imaging device 2, the inverting device 4 and the back surface imaging device 3 may be arranged adjacent to the conveying apparatus 6 in a horizontal direction perpendicular to the X direction.

Further, although connecting rods or hubs are illustrated as the workpieces WK in the above embodiment, the workpieces WK are not limited to these and the workpieces WK include other metal products, resin products and the like.

Although the invention has been described by way of the specific embodiment above, this description is not intended to be interpreted in a restrictive sense. With reference to the description of the invention, various modifications of the disclosed embodiment would be apparent to a person skilled in this art similarly to other embodiments of the invention. Therefore, the scope of appended claims is thought to include the modifications and embodiments without departing from the true scope of the invention.

INDUSTRIAL APPLICABILITY

This invention can be applied to a conveying technique for conveying a plurality of workpieces to a first imaging position, an inversion position and a second imaging position in this order and inspection systems in general for inspecting the workpieces while conveying the workpieces using the conveying technique.

REFERENCE SIGNS LIST 1 inspection system
2 front surface imaging device
3 back surface imaging device
4 inverting device
6 sorting/discharging device
7 control device
62a FU work table
62b FD work table
66a feeder (loading unit)
66b feeder (first feeder)
66c feeder (second feeder)
66d feeder (unloading unit)
Pi1 front surface imaging position (first imaging position)
Pi2 back surface imaging position (second imaging position)
Pld loading position
Pr inversion position
Pt1 upstream transfer position (first transfer position)
Pt2 central transfer position (second transfer position)
Pt3 downstream transfer position (third transfer position)
Pu1 unloading position
WK, WK1-WK5 workpiece
WKa front surface (of workpiece)
WKb back surface (of workpiece)

The invention claimed is:

1. A conveying apparatus for conveying workpieces to a first imaging position where one surface of the workpiece is imaged with the one surface of the workpiece faced up, an inversion position where the workpiece is vertically inverted and a second imaging position where another surface of the workpiece is imaged with the other surface of the workpiece faced up in this order, the apparatus comprising:
a first mover that moves the workpiece between a first transfer position facing the first imaging position and the first imaging position;
a second mover that moves the workpiece between a second transfer position facing the inversion position and the inversion position;
a third mover that moves the workpiece between a third transfer position facing the second imaging position and the second imaging position;
a first feeder that feeds the workpiece from the first transfer position to the second transfer position; and
a second feeder that feeds the workpiece from the second transfer position to the third transfer position,
wherein:
the workpiece having the one surface imaged and the vertically inverted workpiece are respectively defined as an upstream workpiece and a downstream workpiece,
a movement of the upstream workpiece to the first transfer position by the first mover and a movement of the downstream workpiece to the second transfer position by the second mover are performed in synchronization;
a feed of the upstream workpiece from the first transfer position to the second transfer position by the first feeder and a feed of the downstream workpiece from the second transfer position to the third transfer position by the second feeder are performed in synchronization; and a movement of the upstream workpiece from the second transfer position to the inversion position by the second mover and a movement of the downstream workpiece from the third transfer position to the second imaging position by the third mover are performed in synchronization.

2. The conveying apparatus according to claim 1, further comprising:
a loading unit that feeds a workpiece following the upstream workpiece as an unprocessed workpiece to the first transfer position in synchronization with the feed of the upstream workpiece to the second transfer position by the first feeder and the feed of the downstream workpiece to the third transfer position by the second feeder.

3. The conveying apparatus according to claim 2, wherein:
the first mover moves the unprocessed workpiece from the first transfer position to the first imaging position in synchronization with the movement of the upstream workpiece to the inversion position by the second mover and the movement of the downstream workpiece to the second imaging position by the third mover.

4. The conveying apparatus according to claim 1, further comprising:
an unloading unit for carrying out the workpiece having the other surface imaged immediately preceding the downstream workpiece and located at the third transfer position as a processed workpiece from the third transfer position in synchronization with the feed of the upstream workpiece to the second transfer position by the first feeder and the feed of the downstream workpiece to the third transfer position by the second feeder.

5. The conveying apparatus according to claim 1, wherein:
a plurality of work tables that detachably support the workpieces are provided; and
the workpieces are fed by feeding the work tables supporting the workpieces, and the workpieces are moved by moving the work tables supporting the workpieces.

6. The conveying apparatus conveying apparatus according to claim 1, wherein:
the first transfer position, the second transfer position and the third transfer position are respectively positioning vertically below the first imaging position, the inversion position and the second imaging position.

7. The conveying apparatus according to claim 6, wherein:
the first transfer position, the second transfer position and the third transfer position are at same position in a vertical direction;
the first mover, the second mover and the third mover include linear motion mechanisms for moving the workpieces in the vertical direction; and
the first feeder and the second feeder include linear motion mechanisms for moving the workpieces in a horizontal direction.

8. An inspection system, comprising:
a first imaging device that images one surface of a workpiece with the one surface of the workpiece faced up;
an inverting device that vertically inverts the workpiece;
a second imaging device that images another surface of the workpiece with the other surface of the workpiece faced up;
the conveying apparatus according to claim 1, and an inspection apparatus that inspects the workpiece based on a plurality of images captured by the first imaging device and the second imaging device.

9. A conveying method for conveying workpieces to a first imaging position where one surface of the workpiece is imaged with the one surface of the workpiece faced up, an inversion position where the workpiece is vertically inverted and a second imaging position where another surface of the workpiece is imaged with the other surface of the workpiece faced up in this order, the method comprising:
- a first step of moving the inverted workpiece as a downstream workpiece to a second transfer position facing the inversion position in synchronization with a movement of the workpiece having the one surface imaged as an upstream workpiece to a first transfer position facing the first imaging position;
- a second step of feeding the downstream workpiece from the second transfer position to a third transfer position facing the second imaging position in synchronization with a feed of the upstream workpiece from the first transfer position to the second transfer position; and
- a third step of moving the downstream workpiece from the third transfer position to the second imaging position in synchronization with a movement of the upstream workpiece from the second transfer position to the inversion position,
- wherein the first step, the second step and the third step are successively performed in this order.

* * * * *